US012791064B2

(12) United States Patent
Min

(10) Patent No.: US 12,791,064 B2
(45) Date of Patent: Nov. 10, 2026

(54) BALL TYPE CONSTANT VELOCITY JOINT

(71) Applicant: HYUNDAI WIA Corporation, Changwon-si (KR)

(72) Inventor: Byeong Uk Min, Uiwang-si (KR)

(73) Assignee: HYUNDAI WIA Corporation, Changwon-si (KR)

( * ) Notice: Subject to any disclaimer, the term of this patent is extended or adjusted under 35 U.S.C. 154(b) by 0 days.

(21) Appl. No.: 19/413,607

(22) Filed: Dec. 9, 2025

(65) Prior Publication Data

US 2026/0185565 A1 Jul. 2, 2026

(30) Foreign Application Priority Data

Dec. 27, 2024 (KR) ........................ 10-2024-0197852

(51) Int. Cl.

*F16D 3/224* (2011.01)
*F16D 3/2245* (2011.01)
*F16D 3/223* (2011.01)

(52) U.S. Cl.

CPC ........... *F16D 3/224* (2013.01); *F16D 3/2245* (2013.01); *F16D 2003/22303* (2013.01)

(58) Field of Classification Search

CPC ....... Y10T 464/906; F16D 3/223; F16D 3/44; F16D 3/34; F16D 3/2237; F16D 3/227; F16D 3/224; F16D 3/2245

See application file for complete search history.

(56) References Cited

U.S. PATENT DOCUMENTS 2,047,660 A * 7/1936 Anderson ............... F16D 3/224 464/145
2,325,460 A * 7/1943 Amberg .................. F16D 3/224 464/145

(Continued)

*Primary Examiner* — Daniel J Wiley
(74) *Attorney, Agent, or Firm* — Leason Ellis LLP

(57) ABSTRACT

Disclosed is a ball-type constant velocity joint including an inner race including a plurality of first outer circumferential grooves formed therein, an inner cage race including a plurality of second outer circumferential grooves and a plurality of first slots formed therein and surrounding the inner race, a middle cage race including a plurality of first inner circumferential grooves, a plurality of third outer circumferential grooves, and a plurality of second slots formed therein and surrounding the inner cage race, an outer cage race including a plurality of second inner circumferential grooves and a plurality of third slots formed therein and surrounding the middle cage race, an outer race including a plurality of third inner circumferential grooves formed therein and surrounding the outer cage race, a plurality of first balls respectively interposed between the plurality of first outer circumferential grooves and the plurality of first inner circumferential grooves to be constrained by the plurality of first slots, a plurality of second balls respectively interposed between the plurality of second outer circumferential grooves and the plurality of second inner circumferential grooves to be constrained by the plurality of second slots, and a plurality of third balls respectively interposed between the plurality of third outer circumferential grooves and the plurality of third inner circumferential grooves to be constrained by the plurality of third slots. Each of the plurality of grooves is formed to have an arc-shaped bottom surface when viewed in longitudinal-section of the constant velocity joint, and each pair of grooves among the plurality of grooves forming a track for a respective one of the plurality of balls is inclined in opposite directions by a (Continued)

predetermined angle with respect to a central axis of the constant velocity joint so as to be skewed with respect to each other.

11 Claims, 12 Drawing Sheets

(56) References Cited

U.S. PATENT DOCUMENTS

| | | | | |
|---|---|---|---|---|
| 4,455,734 | A * | 6/1984 | Yoshioka | F16D 3/223 29/434 |
| 5,509,857 | A * | 4/1996 | Flaugher | F16D 3/224 464/145 |
| 6,071,195 | A * | 6/2000 | Krude | F16D 3/227 464/145 |
| 6,718,636 | B1 * | 4/2004 | Kochsiek | F16D 3/223 82/1.11 |
| 10,837,498 | B2 * | 11/2020 | Fujio | F16D 3/2245 |
| 2001/0049309 | A1 * | 12/2001 | Perrow | F16D 3/227 464/146 |
| 2003/0073503 | A1 * | 4/2003 | Perrow | F16D 3/227 464/167 |
| 2005/0101391 | A1 * | 5/2005 | Ingalsbe | F16D 3/223 464/145 |
| 2010/0248848 | A1 * | 9/2010 | Costa | F16D 3/20 464/143 |
| 2010/0292016 | A1 * | 11/2010 | Wormsbaecher | F16D 3/223 464/144 |
| 2017/0037909 | A1 * | 2/2017 | Shinoda | F16D 3/2245 |
| 2017/0343050 | A1 * | 11/2017 | Moon | F16D 3/223 |
| 2020/0361239 | A1 * | 11/2020 | Chen | B60K 17/22 |
| 2021/0053106 | A1 * | 2/2021 | Miao | B21J 13/025 |
| 2024/0044376 | A1 * | 2/2024 | Jinno | F16D 3/224 |
| 2024/0183406 | A1 * | 6/2024 | Jang | F16J 3/043 |
| 2025/0198468 | A1 * | 6/2025 | Kim | F16D 3/2237 |

* cited by examiner

BALL TYPE CONSTANT VELOCITY JOINT

CROSS-REFERENCE TO THE RELATED APPLICATION

The present application claims priority to and the benefit of Korean Patent Application No. 10-2024-0197852, filed on Dec. 27, 2024, in the Korean Intellectual Property Office, the entire disclosure of which is incorporated herein by reference.

BACKGROUND

1. Field

The present disclosure relates to a ball-type constant velocity joint.

2. Description of the Related Art

Generally, a ball-type constant velocity joint of a vehicle includes a plurality of inner races, an outer race mounted outside the inner races, a plurality of balls mounted between the inner races and the outer race to transmit rotational power of the inner races to the outer race, and a cage having a plurality of slots formed therein to respectively support the plurality of balls.

The balls are supported by the cage and the inner races, and move within grooves formed in an inner circumferential surface of the outer race in a longitudinal direction according to steering of the vehicle.

In the conventional ball-type constant velocity joint, as the rotation angle of the outer race varies due to the balls, articulation occurs according to displacement of the vehicle.

In order to achieve the function of the constant velocity joint, the plurality of inner races needs to operate sequentially during articulation of the conventional constant velocity joint. However, the conventional structure does not enable control over the operational sequence of the inner races.

Although the conventional constant velocity joint allows articulation and control, a clearance occurs in the rotational direction, which is disadvantageous in terms of backlash, and a sufficient wall thickness of each component is not ensured, resulting in poor strength.

SUMMARY

An aspect of the present disclosure is to provide a ball-type constant velocity joint that allows articulation and control at a larger angle than the related art and that is advantageous in reducing backlash and ensuring joint strength compared to the related art.

A ball-type constant velocity joint according to an embodiment of the present disclosure includes an inner race including a plurality of first outer circumferential grooves formed therein, an inner cage race including a plurality of second outer circumferential grooves and a plurality of first slots formed therein and surrounding the inner race, a middle cage race including a plurality of first inner circumferential grooves, a plurality of third outer circumferential grooves, and a plurality of second slots formed therein and surrounding the inner cage race, an outer cage race including a plurality of second inner circumferential grooves and a plurality of third slots formed therein and surrounding the middle cage race, an outer race including a plurality of third inner circumferential grooves formed therein and surrounding the outer cage race, a plurality of first balls respectively interposed between the plurality of first outer circumferential grooves and the plurality of first inner circumferential grooves to be constrained by the plurality of first slots, a plurality of second balls respectively interposed between the plurality of second outer circumferential grooves and the plurality of second inner circumferential grooves to be constrained by the plurality of second slots, and a plurality of third balls respectively interposed between the plurality of third outer circumferential grooves and the plurality of third inner circumferential grooves to be constrained by the plurality of third slots. Each of the plurality of grooves is formed to have an arc-shaped bottom surface when viewed in longitudinal-section of the constant velocity joint, and each pair of grooves among the plurality of grooves forming a track for a respective one of the plurality of balls is inclined in opposite directions by a predetermined angle with respect to a central axis of the constant velocity joint so as to be skewed with respect to each other.

A ball-type constant velocity joint according to another embodiment of the present disclosure includes an inner race including a plurality of first outer circumferential grooves formed therein, an inner cage race including a plurality of second outer circumferential grooves and a plurality of first slots formed therein and surrounding the inner race, a middle cage race including a plurality of first inner circumferential grooves, a plurality of third outer circumferential grooves, and a plurality of second slots formed therein and surrounding the inner cage race, an outer cage race including a plurality of second inner circumferential grooves and a plurality of third slots formed therein and surrounding the middle cage race, an outer race including a plurality of third inner circumferential grooves formed therein and surrounding the outer cage race, a plurality of first balls respectively interposed between the plurality of first outer circumferential grooves and the plurality of first inner circumferential grooves to be constrained by the plurality of first slots, a plurality of second balls respectively interposed between the plurality of second outer circumferential grooves and the plurality of second inner circumferential grooves to be constrained by the plurality of second slots, and a plurality of third balls respectively interposed between the plurality of third outer circumferential grooves and the plurality of third inner circumferential grooves to be constrained by the plurality of third slots. Each of the plurality of grooves is formed to have an arc-shaped bottom surface when viewed in longitudinal-section of the constant velocity joint.

A ball-type constant velocity joint according to still another embodiment of the present disclosure includes an inner race including a plurality of first outer circumferential grooves formed therein, an inner cage race including a plurality of second outer circumferential grooves and a plurality of first slots formed therein and surrounding the inner race, a middle cage race including a plurality of first inner circumferential grooves, a plurality of third outer circumferential grooves, and a plurality of second slots formed therein and surrounding the inner cage race, an outer cage race including a plurality of second inner circumferential grooves and a plurality of third slots formed therein and surrounding the middle cage race, an outer race including a plurality of third inner circumferential grooves formed therein and surrounding the outer cage race, a plurality of first balls respectively interposed between the plurality of first outer circumferential grooves and the plurality of first inner circumferential grooves to be constrained by the plurality of first slots, a plurality of second balls respectively interposed between the plurality of second outer circumferential grooves and the plurality of second inner circumferential grooves to be constrained by the plurality of second slots, and a plurality of third balls respectively interposed between the plurality of third outer circumferential grooves and the plurality of third inner circumferential grooves to be constrained by the plurality of third slots. Each pair of grooves among the plurality of grooves forming a track for a respective one of the plurality of balls is inclined in opposite directions by a predetermined angle with respect to a central axis of the constant velocity joint so as to be skewed with respect to each other.

A ball-type constant velocity joint according to a further embodiment of the present disclosure includes an inner race including a plurality of first outer circumferential grooves formed therein, an inner cage race including a plurality of second outer circumferential grooves and a plurality of first slots formed therein and surrounding the inner race, a middle cage race including a plurality of first inner circumferential grooves, a plurality of third outer circumferential grooves, and a plurality of second slots formed therein and surrounding the inner cage race, an outer cage race including a plurality of second inner circumferential grooves and a plurality of third slots formed therein and surrounding the middle cage race, an outer race including a plurality of third inner circumferential grooves formed therein and surrounding the outer cage race, a plurality of first balls respectively interposed between the plurality of first outer circumferential grooves and the plurality of first inner circumferential grooves to be constrained by the plurality of first slots, a plurality of second balls respectively interposed between the plurality of second outer circumferential grooves and the plurality of second inner circumferential grooves to be constrained by the plurality of second slots, and a plurality of third balls respectively interposed between the plurality of third outer circumferential grooves and the plurality of third inner circumferential grooves to be constrained by the plurality of third slots. Among the plurality of grooves formed in the inner race and the middle cage race, each pair of grooves forming a track for a respective one of the plurality of first balls is inclined in opposite directions by a predetermined angle with respect to a central axis of the constant velocity joint. Among the plurality of grooves formed in the middle cage race and the outer race, each pair of grooves forming a track for a respective one of the plurality of third balls is inclined in opposite directions by a predetermined angle with respect to the central axis of the constant velocity joint. Among the plurality of grooves formed in the inner cage race and the outer cage race, each pair of grooves forming a track for a respective one of the plurality of second balls is formed parallel to each other.

The plurality of grooves having the arc-shaped bottom surface may be arranged such that centers of curvature of the plurality of grooves coincide with each other.

The plurality of grooves having the arc-shaped bottom surface may be arranged such that the centers of curvature of the plurality of grooves coincide with a rotational center of the constant velocity joint.

The plurality of grooves having the arc-shaped bottom surface may be arranged such that the centers of curvature of the plurality of grooves coincide with the rotational center of the constant velocity joint in the longitudinal direction of the constant velocity joint and are offset from the rotational center of the constant velocity joint in the radial direction of the constant velocity joint.

The centers of curvature of the plurality of grooves having the arc-shaped bottom surface may be positioned closer to corresponding ones of the plurality of grooves than the rotational center of the constant velocity joint in the radial direction of the constant velocity joint.

The centers of curvature of the plurality of grooves having the arc-shaped bottom surface may be positioned farther from corresponding ones of the plurality of grooves than the rotational center of the constant velocity joint in the radial direction of the constant velocity joint.

Among the plurality of grooves formed in each of the races, each pair of adjacent grooves may be inclined in opposite directions by a predetermined angle with respect to the central axis of the constant velocity joint.

If the inner race is articulated by an angle of N with respect to the central axis of the constant velocity joint, the inner cage race may be articulated by an angle of 3N/4, the middle cage race may be articulated by an angle of N/2, and the outer cage race may be articulated by an angle of N/4.

BRIEF DESCRIPTION OF THE DRAWINGS

The accompanying drawings, which are incorporated in this specification, illustrate exemplary embodiments and serve to further illustrate the technical ideas of the disclosure in conjunction with the detailed description of exemplary embodiments that follows, and the disclosure is not to be construed as limited to what is shown in such drawings. In the drawings.

DETAILED DESCRIPTION OF EXEMPLARY EMBODIMENTS

Figure 1:
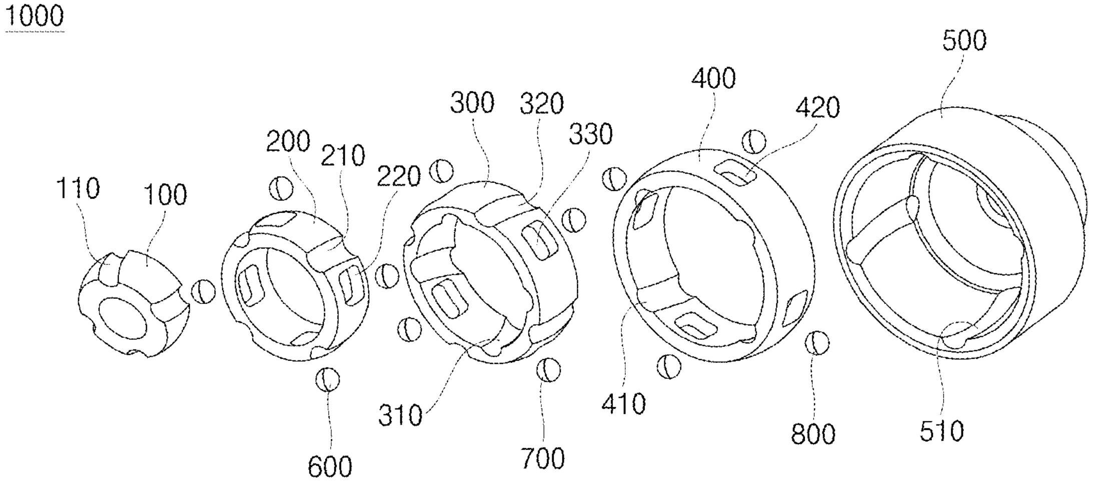
FIG. 1 is an exploded perspective view of a ball-type constant velocity joint according to an embodiment of the present disclosure.

Hereinafter, a ball-type constant velocity joint according to an embodiment of the present disclosure will be described in detail with reference to the accompanying drawings.

It should be understood that the terms used in the specification and appended claims should not be construed as being limited to general or dictionary meanings but be construed based on the meanings and concepts according to the spirit of the present disclosure on the basis of the principle that the inventor is permitted to define appropriate terms for the best explanation.

Embodiments described in the specification and the configuration illustrated in the drawings are merely considered to be preferred embodiments and do not represent all the technical ideas of the present disclosure, and thus it should be understood that various equivalents and modifications may exist at the time of filing this application.

Figure 2:
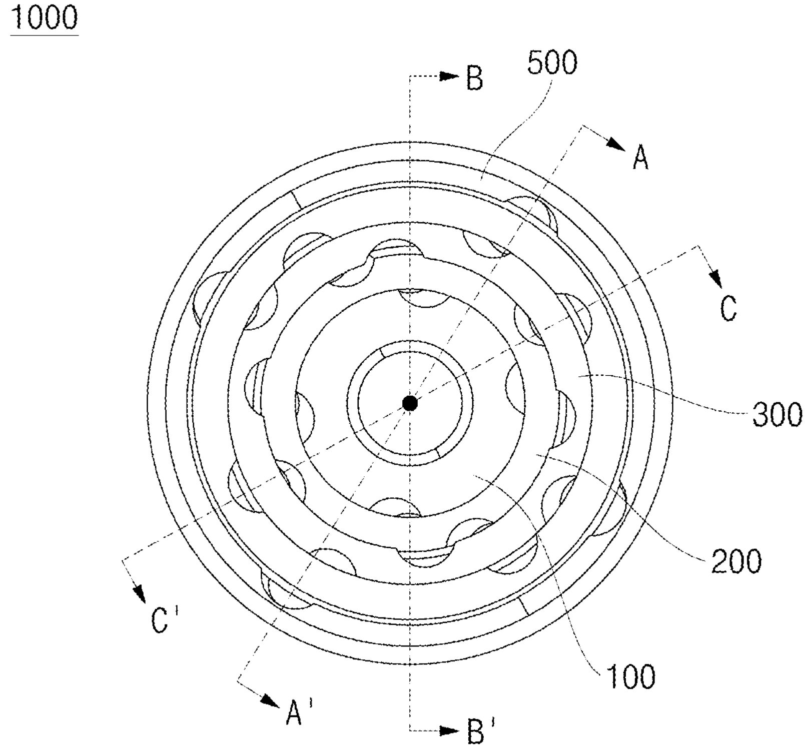
FIG. 2 is a coupled front view of the ball-type constant velocity joint according to the embodiment of the present disclosure.
Figure 3A:
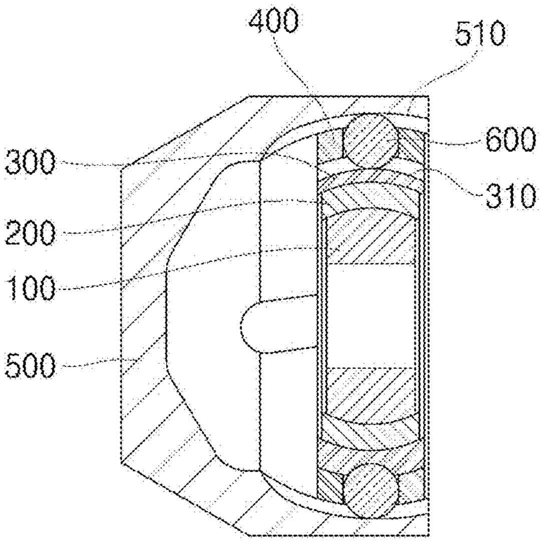
FIG. 3A is a longitudinal-sectional view taken along line A-A' in FIG. 2.
Figure 3B:
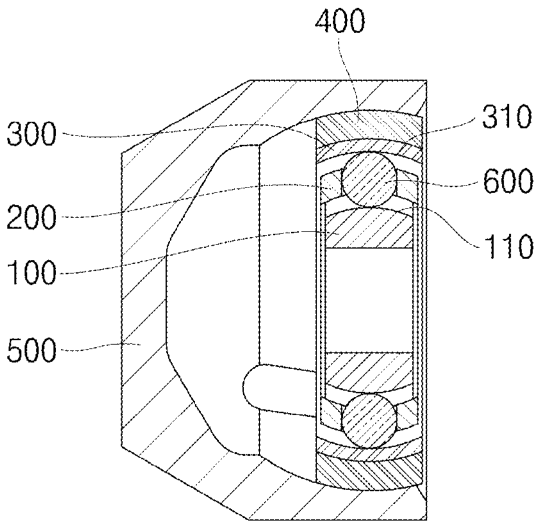
FIG. 3B is a longitudinal-sectional view taken along line B-B' in FIG. 2.
Figure 3C:
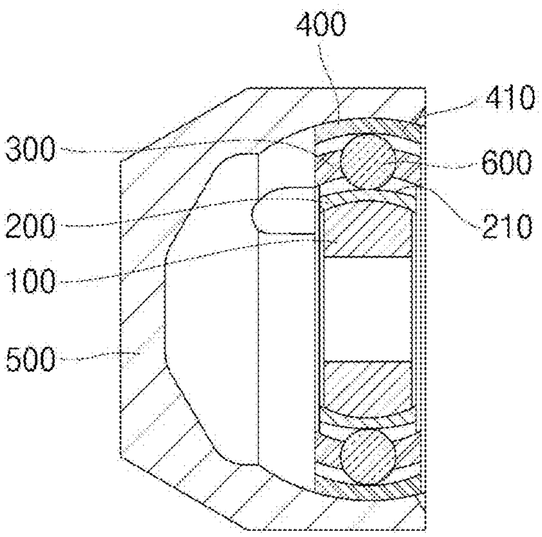
FIG. 3C is a longitudinal-sectional view taken along line C-C' in FIG. 2.
Figure 4A:
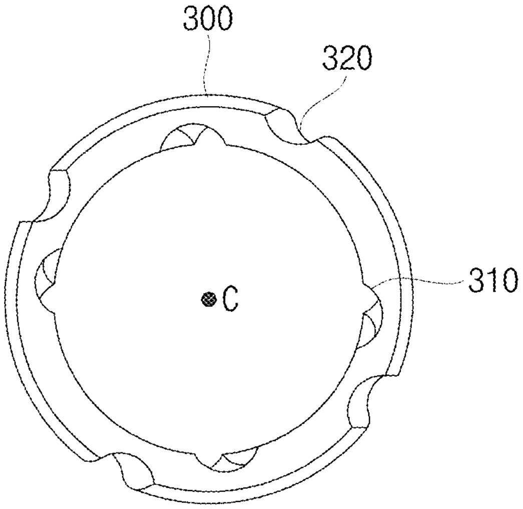
FIG. 4A is a front view of a middle cage race of the ball-type constant velocity joint according to the embodiment of the present disclosure.
Figure 4B:
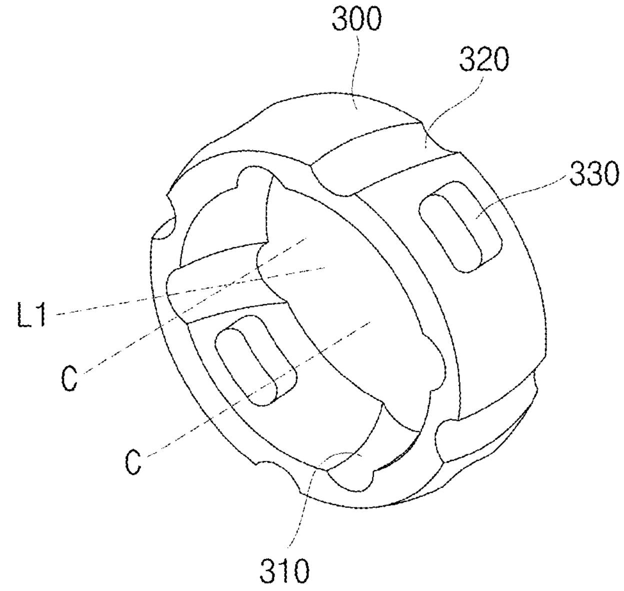
FIG. 4B is a perspective view of the middle cage race of the ball-type constant velocity joint according to the embodiment of the present disclosure, which shows a relationship between a central axis of the constant velocity joint and a skewed angle of a first inner circumferential groove.
Figure 4C:
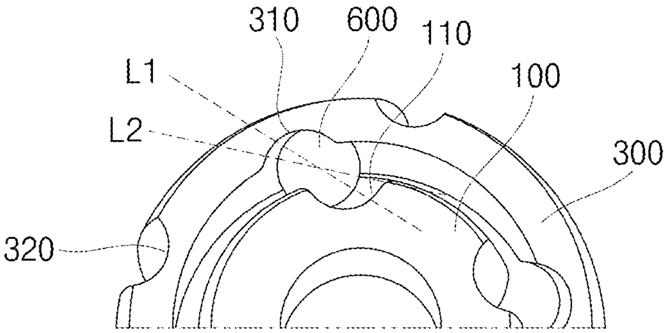
FIG. 4C is a view showing a relationship between the skewed angle of the first inner circumferential groove and a skewed angle of a first outer circumferential groove in a state in which an inner race, the middle cage race, and first balls are engaged with each other in the ball-type constant velocity joint according to the embodiment of the present disclosure.
Figure 4D:
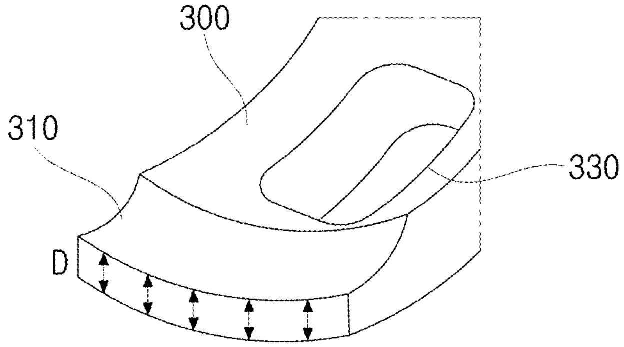
FIG. 4D is a view showing the middle cage race of the ball-type constant velocity joint according to the embodiment of the present disclosure when cut in a longitudinal direction at a position of the first inner circumferential groove.
Figure 5:
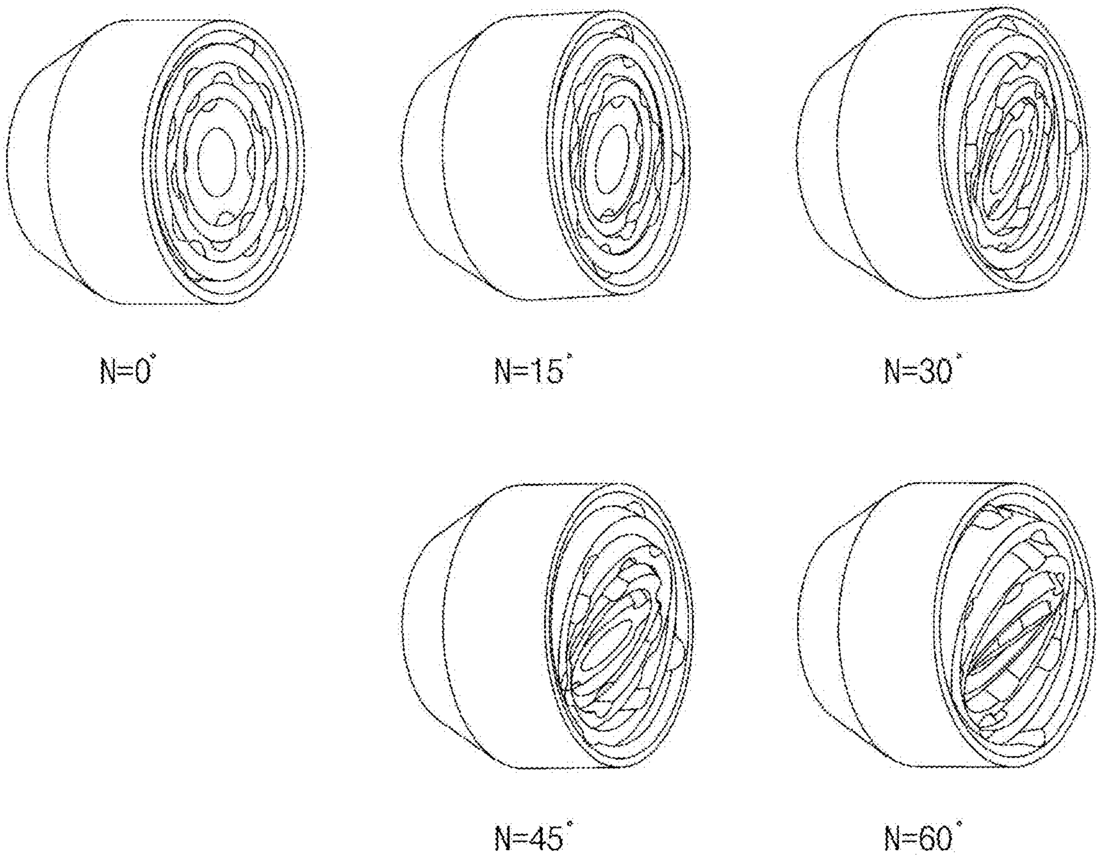
FIG. 5 is a view sequentially showing articulation operations of the ball-type constant velocity joint according to the embodiment of the present disclosure.

FIG. 1 is an exploded perspective view of a ball-type constant velocity joint 1000 according to an embodiment of the present disclosure, and FIG. 2 is a coupled front view of the ball-type constant velocity joint 1000 according to the embodiment of the present disclosure. FIG. 3A is a longitudinal-sectional view taken along line A-A' in FIG. 2, FIG. 3B is a longitudinal-sectional view taken along line B-B' in FIG. 2, and FIG. 3C is a longitudinal-sectional view taken along line C-C' in FIG. 2. FIG. 4A is a front view of a middle cage race 300 of the ball-type constant velocity joint 1000 according to the embodiment of the present disclosure, FIG. 4B is a perspective view of the middle cage race 300 of the ball-type constant velocity joint 1000 according to the embodiment of the present disclosure, which shows a relationship between a central axis C of the constant velocity joint 1000 and a skewed angle L1 of a first inner circumferential groove 310, FIG. 4C is a view showing a relationship between the skewed angle L1 of the first inner circumferential groove 310 and a skewed angle L2 of a first outer circumferential groove 110 in a state in which an inner race 100, the middle cage race 300, and first balls 600 are engaged with each other in the ball-type constant velocity joint 1000 according to the embodiment of the present disclosure, and FIG. 4D is a view showing the middle cage race 300 of the ball-type constant velocity joint 1000 according to the embodiment of the present disclosure when cut in a longitudinal direction at a position of the first inner circumferential groove 310. FIG. 5 is a view sequentially showing articulation operations of the ball-type constant velocity joint 1000 according to the embodiment of the present disclosure.

Referring to FIGS. 1 to 3C, the ball-type constant velocity joint 1000 according to the embodiment of the present disclosure may include an inner race 100, an inner cage race 200, a middle cage race 300, an outer cage race 400, an outer race 500, a plurality of first balls 600, a plurality of second balls 700, and a plurality of third balls 800.

The inner race 100 may be formed in a substantially ring shape and may include a plurality of first outer circumferential grooves 110 formed therein.

The first outer circumferential grooves 110 may be formed at regular intervals in a circumferential direction along an outer circumference of the inner race 100.

As shown in FIGS. 3A to 3C, each of the first outer circumferential grooves 110 may be formed to have an arc-shaped bottom surface when viewed in longitudinal-section of the constant velocity joint 1000.

Among the first outer circumferential grooves 110 formed in the inner race 100, each pair of adjacent first outer circumferential grooves 110 may be inclined in opposite directions by a predetermined angle with respect to the central axis C of the constant velocity joint 1000.

The inner cage race 200 may be formed in a substantially ring shape and may include a plurality of second outer circumferential grooves 210 and a plurality of first slots 220 formed therein. The inner cage race 200 may be mounted to surround the inner race 100.

The second outer circumferential grooves 210 may be formed at regular intervals in the circumferential direction along an outer circumference of the inner cage race 200.

As shown in FIGS. 3A to 3C, each of the second outer circumferential grooves 210 may be formed to have an arc-shaped bottom surface when viewed in longitudinal-section of the constant velocity joint 1000.

Among the second outer circumferential grooves 210 formed in the inner cage race 200, each pair of adjacent second outer circumferential grooves 210 may be inclined in opposite directions by a predetermined angle with respect to the central axis C of the constant velocity joint 1000.

The first slots 220 may be formed at regular intervals in the circumferential direction of the inner cage race 200. The first slots 220 and the second outer circumferential grooves 210 may be alternately disposed. The first slots 220 may be positioned corresponding to the first outer circumferential grooves 110 in the inner race 100. Each of the first balls 600 may be disposed in a respective one of the first slots 220.

The middle cage race 300 may be formed in a substantially ring shape and may include a plurality of first inner circumferential grooves 310, a plurality of third outer circumferential grooves 320, and a plurality of second slots 330 formed therein. The middle cage race 300 may be mounted to surround the inner cage race 200.

The first inner circumferential grooves 310 may be formed at regular intervals in the circumferential direction along an inner circumference of the middle cage race 300 and may be positioned corresponding to the first slots 220 in the inner cage race 200 and the first outer circumferential grooves 110 in the inner race 100.

As shown in FIGS. 3A to 3C, each of the first inner circumferential grooves 310 may be formed to have an arc-shaped bottom surface when viewed in longitudinal-section of the constant velocity joint 1000.

As can be clearly seen in FIG. 4B, among the first inner circumferential grooves 310 formed in the middle cage race 300, each pair of adjacent first inner circumferential grooves 310 may be inclined in opposite directions by a predetermined angle with respect to the central axis C of the constant velocity joint 1000 (L1).

The first outer circumferential grooves 110 in the inner race 100 and the first inner circumferential grooves 310 in the middle cage race 300 may form a first track that ensures constant velocity through the first balls 600. Because the inner cage race 200 is mounted between the inner race 100 and the middle cage race 300, the first balls 600 may be constrained by the first slots 220 in the inner cage race 200.

As can be clearly seen in FIG. 4C, the first outer circumferential grooves 110 and the first inner circumferential grooves 310 may be inclined in opposite directions by a predetermined angle with respect to the central axis C of the constant velocity joint 1000 so as to be skewed with respect to each other in an X-shape (L1 and L2). Accordingly, an X-shaped skewed angle may be formed between the first outer circumferential grooves 110 and the first inner circumferential grooves 310, and each of the first balls 600 may be positioned at the intersection of the X-shape to be constrained by a respective one of the first slots 220.

Force of pushing the first balls 600 may be generated by the first outer circumferential grooves 110 and the first inner circumferential grooves 310 that form an X-shaped skewed angle therebetween, and accordingly, the operability of the constant velocity joint 1000 may be ensured.

The rotational center C of the constant velocity joint 1000 may coincide with the centers of curvature of the arc-shaped first outer circumferential grooves 110 and first inner circumferential grooves 310. Therefore, as can be clearly seen in FIG. 4D, the wall thickness D of each groove may be uniformly secured, which is advantageous in terms of strength. This feature may be applied to all pairs of X-shaped grooves positioned above and below with the balls interposed therebetween.

Because the first outer circumferential grooves 110 and the first inner circumferential grooves 310 are skewed with respect to each other in an X-shape, a clearance may be reduced compared to grooves formed in an II-shape, which is advantageous in terms of backlash. This feature may be applied to all pairs of X-shaped grooves positioned above and below with the balls interposed therebetween.

The third outer circumferential grooves 320 may be formed at regular intervals in the circumferential direction along an outer circumference of the middle cage race 300.

As shown in FIGS. 3A to 3C, each of the third outer circumferential grooves 320 may be formed to have an arc-shaped bottom surface when viewed in longitudinal-section of the constant velocity joint 1000.

Among the third outer circumferential grooves 320 formed in the middle cage race 300, each pair of adjacent third outer circumferential grooves 320 may be inclined in opposite directions by a predetermined angle with respect to the central axis C of the constant velocity joint 1000.

The second slots 330 may be formed at regular intervals in the circumferential direction of the middle cage race 300. The second slots 330 and the third outer circumferential grooves 320 may be alternately disposed. The second slots 330 may be positioned corresponding to the second outer circumferential grooves 210 in the inner cage race 200. Each of the second balls 700 may be disposed in a respective one of the second slots 330.

The outer cage race 400 may be formed in a substantially ring shape and may include a plurality of second inner circumferential grooves 410 and a plurality of third slots 420 formed therein. The outer cage race 400 may be mounted to surround the middle cage race 300.

The second inner circumferential grooves 410 may be formed at regular intervals in the circumferential direction along an inner circumference of the outer cage race 400 and may be positioned corresponding to the second slots 330 in the middle cage race 300 and the second outer circumferential grooves 210 in the inner cage race 200.

As shown in FIGS. 3A to 3C, each of the second inner circumferential grooves 410 may be formed to have an arc-shaped bottom surface when viewed in longitudinal-section of the constant velocity joint 1000.

Among the second inner circumferential grooves 410 formed in the outer cage race 400, each pair of adjacent second inner circumferential grooves 410 may be inclined in opposite directions by a predetermined angle with respect to the central axis C of the constant velocity joint 1000.

The second outer circumferential grooves 210 in the inner cage race 200 and the second inner circumferential grooves 410 in the outer cage race 400 may form a second track that ensures constant velocity through the second balls 700. Because the middle cage race 300 is mounted between the inner cage race 200 and the outer cage race 400, the second balls 700 may be constrained by the second slots 330 in the middle cage race 300.

Similar to the configuration described above, the second outer circumferential grooves 210 and the second inner circumferential grooves 410 may be inclined in opposite directions by a predetermined angle with respect to the central axis C of the constant velocity joint 1000 so as to be skewed with respect to each other in an X-shape. Accordingly, an X-shaped skewed angle may be formed between the second outer circumferential grooves 210 and the second inner circumferential grooves 410, and each of the second balls 700 may be positioned at the intersection of the X-shape to be constrained by a respective one of the second slots 330.

Force of pushing the second balls 700 may be generated by the second outer circumferential grooves 210 and the second inner circumferential grooves 410 that form an X-shaped skewed angle therebetween, and accordingly, the operability of the constant velocity joint 1000 may be ensured.

The rotational center C of the constant velocity joint 1000 may coincide with the centers of curvature of the arc-shaped second outer circumferential grooves 210 and second inner circumferential grooves 410. Therefore, the wall thickness of each groove may be uniformly secured, which is advantageous in terms of strength.

Because the second outer circumferential grooves 210 and the second inner circumferential grooves 410 are skewed with respect to each other in an X-shape, a clearance may be reduced compared to grooves formed in an II-shape, which is advantageous in terms of backlash.

The outer race 500 may include a plurality of third inner circumferential grooves 510 formed therein and may be mounted to surround the outer cage race 400. For example, the outer race 500 may have a shape in which a substantially cylindrical structure and a substantially conical structure are combined and may accommodate the inner race 100, the inner cage race 200, the middle cage race 300, and the outer cage race 400.

The third inner circumferential grooves 510 may be formed at regular intervals in the circumferential direction along an inner circumference of the outer race 500 and may be positioned corresponding to the third slots 420 in the outer cage race 400 and the third outer circumferential grooves 320 in the middle cage race 300.

As shown in FIGS. 3A to 3C, each of the third inner circumferential grooves 510 may be formed to have an arc-shaped bottom surface when viewed in longitudinal-section of the constant velocity joint 1000.

The third inner circumferential grooves 510 in the outer race 500 and the third outer circumferential grooves 320 in the middle cage race 300 may form a third track that ensures constant velocity through the third balls 800. Because the outer cage race 400 is mounted between the outer race 500 and the middle cage race 300, the third balls 800 may be constrained by the third slots 420 in the outer cage race 400.

Similar to the configuration described above, the third inner circumferential grooves 510 and the third outer circumferential grooves 320 may be inclined in opposite directions by a predetermined angle with respect to the central axis C of the constant velocity joint 1000 so as to be skewed with respect to each other in an X-shape. Accordingly, an X-shaped skewed angle may be formed between the third inner circumferential grooves 510 and the third outer circumferential grooves 320, and each of the third balls 800 may be positioned at the intersection of the X-shape to be constrained by a respective one of the third slots 420.

Force of pushing the third balls 800 may be generated by the third inner circumferential grooves 510 and the third outer circumferential grooves 320 that form an X-shaped skewed angle therebetween, and accordingly, the operability of the constant velocity joint 1000 may be ensured.

The rotational center C of the constant velocity joint 1000 may coincide with the centers of curvature of the arc-shaped third inner circumferential grooves 510 and third outer circumferential grooves 320. Therefore, the wall thickness of each groove may be uniformly secured, which is advantageous in terms of strength.

Because the third inner circumferential grooves 510 and the third outer circumferential grooves 320 are skewed with respect to each other in an X-shape, a clearance may be reduced compared to grooves formed in an II-shape, which is advantageous in terms of backlash.

Each of the plurality of first balls 600 may be interposed between a respective one of the first outer circumferential grooves 110 and a respective one of the first inner circumferential grooves 310 and may be constrained by a respective one of the first slots 220.

Each of the plurality of second balls 700 may be interposed between a respective one of the second outer circumferential grooves 210 and a respective one of the second inner circumferential grooves 410 and may be constrained by a respective one of the second slots 330.

Each of the plurality of third balls 800 may be interposed between a respective one of the third outer circumferential grooves 320 and a respective one of the third inner circumferential grooves 510 and may be constrained by a respective one of the third slots 420.

In the constant velocity joint 1000 according to the embodiment, as shown in FIG. 5, if the inner race 100 is articulated by an angle of N (e.g., 60°) with respect to the central axis of the constant velocity joint 1000, the inner cage race 200 may be articulated by an angle of 3N/4 (e.g., 45°), the middle cage race 300 may be articulated by an angle of N/2 (e.g., 30°), and the outer cage race 400 may be articulated by an angle of N/4 (e.g., 15°).

Figure 6:
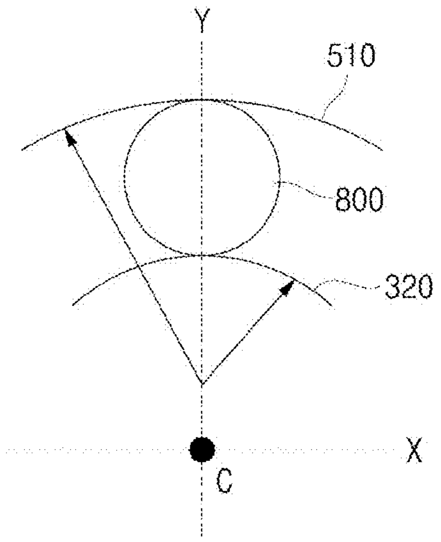
FIG. 6 is a view showing a first modification of the ball-type constant velocity joint according to the embodiment of the present disclosure.

FIG. 6 is a view showing a first modification of the ball-type constant velocity joint according to the embodiment of the present disclosure.

According to the first modification, when viewed in longitudinal-section of the constant velocity joint 1000, the rotational center C of the constant velocity joint 1000 and the centers of curvature of the arc-shaped grooves may coincide with each other in the longitudinal direction of the constant velocity joint 1000 and may be offset from each other in the radial direction of the constant velocity joint 1000.

For example, as shown in FIG. 6, when viewed in longitudinal-section of the constant velocity joint 1000, the rotational center C of the constant velocity joint 1000 and the centers of curvature of the arc-shaped third outer circumferential grooves 320 and third inner circumferential grooves 510 may coincide with each other in the X-axis direction and may be offset from each other in the Y-axis direction.

For example, as shown on the left side of FIG. 6, the centers of curvature of the arc-shaped third outer circumferential groove 320 and third inner circumferential groove 510 may be positioned above the X-axis with respect to the rotational center C of the constant velocity joint 1000, and as shown on the right side of FIG. 6, the centers of curvature of the arc-shaped third outer circumferential groove 320 and third inner circumferential groove 510 may be positioned below the X-axis with respect to the rotational center C of the constant velocity joint 1000.

The configuration shown on the left side of FIG. 6 is relatively advantageous in securing a sufficient wall thickness of the grooves, and the configuration shown on the right side of FIG. 6 is relatively advantageous in improving torque transmission efficiency of the constant velocity joint 1000. Accordingly, a wall thickness margin and strength of specific races may be selectively secured, thereby optimizing the constant velocity joint 1000.

Although FIG. 6 representatively shows the third outer circumferential groove 320 and the third inner circumferential groove 510, the same configuration may be applied to all pairs of grooves positioned above and below with the ball interposed therebetween.

For example, when viewed in longitudinal-section of the constant velocity joint 1000, the rotational center C of the constant velocity joint 1000 and the centers of curvature of the arc-shaped first outer circumferential grooves 110 and first inner circumferential grooves 310 may coincide with each other in the X-axis direction (longitudinal direction of the constant velocity joint 1000) and may be positively or negatively (+/−) offset from each other in the Y-axis direction (radial direction of the constant velocity joint 1000). When viewed in longitudinal-section of the constant velocity joint 1000, the rotational center C of the constant velocity joint 1000 and the centers of curvature of the arc-shaped second outer circumferential grooves 210 and second inner circumferential grooves 410 may coincide with each other in the X-axis direction (longitudinal direction of the constant velocity joint 1000) and may be positively or negatively (+/−) offset from each other in the Y-axis direction (radial direction of the constant velocity joint 1000).

Figure 7:
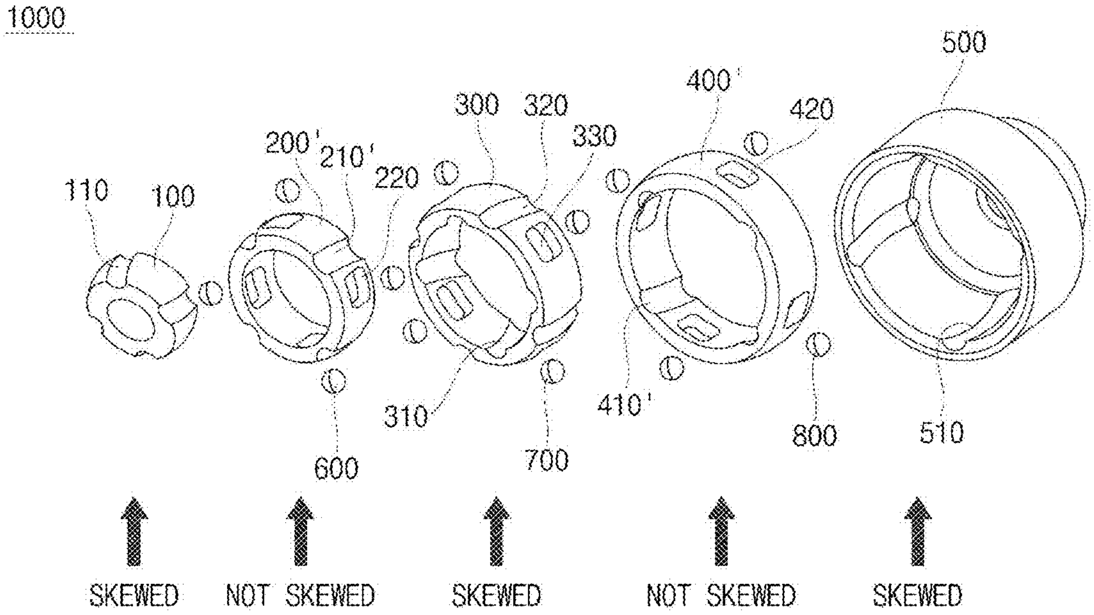
FIG. 7 is a view showing a second modification of the ball-type constant velocity joint according to the embodiment of the present disclosure.

FIG. 7 is a view showing a second modification of the ball-type constant velocity joint 1000 according to the embodiment of the present disclosure.

According to the second modification, the second outer circumferential grooves 210' in the inner cage race 200' and the second inner circumferential grooves 410' in the outer cage race 400' may be formed as II-shaped grooves that are not skewed with respect to each other.

The motive force of the vehicle may be transmitted in the order of the inner race 100, the middle cage race 300, and the outer race 500. The inner cage race 200' and the outer cage race 400' may serve to control the articulation of the constant velocity joint 1000 without directly receiving the motive force of the vehicle. Accordingly, because relatively high strength and relatively large wall thickness of grooves are not required for the inner cage race 200' and the outer cage race 400', the second outer circumferential grooves 210' and the second inner circumferential grooves 410' may be formed as II-shaped grooves that are not skewed with respect to each other.

Because the inner race 100, the middle cage race 300, and the outer race 500 directly receive the motive force of the vehicle, high strength and sufficient wall thickness need to be secured. Accordingly, the first outer circumferential grooves 110 and the first inner circumferential grooves 310 may be formed as skewed grooves inclined with respect to each other, and the third inner circumferential grooves 510 and the third outer circumferential grooves 320 may be formed as skewed grooves inclined with respect to each other.

As the grooves become more inclined, the width (dimension in the circumferential direction) of the slots that constrain the balls needs to be increased. However, in the above configuration, the width of the second slots 330 formed in the middle cage race 300 may be minimized to enhance strength. As such, the size of the second slots 330 in the middle cage race 300 may be reduced, thereby increasing the strength of the components.

As described above, if the bottom surfaces of the respective grooves are formed to have an arc shape, even though no skewed angle is formed in the second outer circumferential grooves 210' and the second inner circumferential grooves 410', the motive force of the vehicle may still be transmitted in the order of the inner race 100, the middle cage race 300, and the outer race 500, because an X-shaped skewed angle exists between the first outer circumferential grooves 110 and the second inner circumferential grooves 410 that form the first track for the first balls 600 and between the third outer circumferential grooves 320 and the third inner circumferential grooves 510 that form the third track for the third balls 800. Accordingly, the operability of the constant velocity joint 1000 may still be secured.

In the second modification, the parts other than the above-described characteristic parts are substantially the same as those of the embodiment described above with reference to FIGS. 1 to 5. Therefore, redundant descriptions thereof will be omitted, and the same reference numerals are used in the drawings.

The first structure in which each groove is formed to have an arc-shaped bottom surface when viewed in longitudinal-section of the constant velocity joint 1000 and the second structure in which each pair of grooves forming a track for the ball is inclined in opposite directions by a predetermined angle with respect to the central axis of the constant velocity joint 1000 so as to be skewed with respect to each other in an X-shape may be simultaneously applied to the constant velocity joint 1000, or only one of the two structural features may be applied to the constant velocity joint 1000.

The third structure in which both X-shaped skewed grooves and II-shaped skewed grooves are formed may be applied to the constant velocity joint 1000 together with the above-described first structure or may be implemented independently.

As is apparent from the above description, the ball-type constant velocity joint of the present disclosure may allow articulation and control at a larger angle than the related art and may be advantageous in reducing backlash and ensuring joint strength compared to the related art.

Although the present disclosure has been described above with reference to the exemplary embodiments, the present disclosure is not limited thereto, and it should be understood that various changes and modifications can be made by those skilled in the art without departing from the spirit and scope of the disclosure as defined by the appended claims.

What is claimed is:

1. A ball-type constant velocity joint comprising:

an inner race comprising a plurality of first outer circumferential grooves formed therein;

an inner cage race comprising a plurality of second outer circumferential grooves and a plurality of first slots formed therein, the inner cage race surrounding the inner race;

a middle cage race comprising a plurality of first inner circumferential grooves, a plurality of third outer circumferential grooves, and a plurality of second slots formed therein, the middle cage race surrounding the inner cage race;

an outer cage race comprising a plurality of second inner circumferential grooves and a plurality of third slots formed therein, the outer cage race surrounding the middle cage race;

an outer race comprising a plurality of third inner circumferential grooves formed therein, the outer race surrounding the outer cage race;

a plurality of first balls respectively interposed between the plurality of first outer circumferential grooves and the plurality of first inner circumferential grooves to be constrained by the plurality of first slots;

a plurality of second balls respectively interposed between the plurality of second outer circumferential grooves and the plurality of second inner circumferential grooves to be constrained by the plurality of second slots; and a plurality of third balls respectively interposed between the plurality of third outer circumferential grooves and the plurality of third inner circumferential grooves to be constrained by the plurality of third slots, wherein each of the plurality of grooves is formed to have an arc-shaped bottom surface when viewed in longitudinal-section of the constant velocity joint, and each pair of grooves among the plurality of grooves forming a track for a respective one of the plurality of balls is inclined in opposite directions by a predetermined angle with respect to a central axis of the constant velocity joint so as to be skewed with respect to each other.

2. A ball-type constant velocity joint comprising:

an inner race comprising a plurality of first outer circumferential grooves formed therein;

an inner cage race comprising a plurality of second outer circumferential grooves and a plurality of first slots formed therein, the inner cage race surrounding the inner race;

a middle cage race comprising a plurality of first inner circumferential grooves, a plurality of third outer circumferential grooves, and a plurality of second slots formed therein, the middle cage race surrounding the inner cage race;

an outer cage race comprising a plurality of second inner circumferential grooves and a plurality of third slots formed therein, the outer cage race surrounding the middle cage race;

an outer race comprising a plurality of third inner circumferential grooves formed therein, the outer race surrounding the outer cage race;

a plurality of first balls respectively interposed between the plurality of first outer circumferential grooves and the plurality of first inner circumferential grooves to be constrained by the plurality of first slots;

a plurality of second balls respectively interposed between the plurality of second outer circumferential grooves and the plurality of second inner circumferential grooves to be constrained by the plurality of second slots; and a plurality of third balls respectively interposed between the plurality of third outer circumferential grooves and the plurality of third inner circumferential grooves to be constrained by the plurality of third slots, wherein each of the plurality of grooves is formed to have an arc-shaped bottom surface when viewed in longitudinal-section of the constant velocity joint.

3. A ball-type constant velocity joint comprising:

an inner race comprising a plurality of first outer circumferential grooves formed therein;

an inner cage race comprising a plurality of second outer circumferential grooves and a plurality of first slots formed therein, the inner cage race surrounding the inner race;

a middle cage race comprising a plurality of first inner circumferential grooves, a plurality of third outer circumferential grooves, and a plurality of second slots formed therein, the middle cage race surrounding the inner cage race;

an outer cage race comprising a plurality of second inner circumferential grooves and a plurality of third slots formed therein, the outer cage race surrounding the middle cage race;

an outer race comprising a plurality of third inner circumferential grooves formed therein, the outer race surrounding the outer cage race;

a plurality of first balls respectively interposed between the plurality of first outer circumferential grooves and the plurality of first inner circumferential grooves to be constrained by the plurality of first slots;

a plurality of second balls respectively interposed between the plurality of second outer circumferential grooves and the plurality of second inner circumferential grooves to be constrained by the plurality of second slots; and a plurality of third balls respectively interposed between the plurality of third outer circumferential grooves and the plurality of third inner circumferential grooves to be constrained by the plurality of third slots, wherein each pair of grooves among the plurality of grooves forming a track for a respective one of the plurality of balls is inclined in opposite directions by a predetermined angle with respect to a central axis of the constant velocity joint so as to be skewed with respect to each other.

4. A ball-type constant velocity joint comprising:

an inner race comprising a plurality of first outer circumferential grooves formed therein;

an inner cage race comprising a plurality of second outer circumferential grooves and a plurality of first slots formed therein, the inner cage race surrounding the inner race;

a middle cage race comprising a plurality of first inner circumferential grooves, a plurality of third outer circumferential grooves, and a plurality of second slots formed therein, the middle cage race surrounding the inner cage race;

an outer cage race comprising a plurality of second inner circumferential grooves and a plurality of third slots formed therein, the outer cage race surrounding the middle cage race;

an outer race comprising a plurality of third inner circumferential grooves formed therein, the outer race surrounding the outer cage race;

a plurality of first balls respectively interposed between the plurality of first outer circumferential grooves and the plurality of first inner circumferential grooves to be constrained by the plurality of first slots;

a plurality of second balls respectively interposed between the plurality of second outer circumferential grooves and the plurality of second inner circumferential grooves to be constrained by the plurality of second slots; and a plurality of third balls respectively interposed between the plurality of third outer circumferential grooves and the plurality of third inner circumferential grooves to be constrained by the plurality of third slots, wherein, among the plurality of grooves formed in the inner race and the middle cage race, each pair of grooves forming a track for a respective one of the plurality of first balls is inclined in opposite directions by a predetermined angle with respect to a central axis of the constant velocity joint, wherein, among the plurality of grooves formed in the middle cage race and the outer race, each pair of grooves forming a track for a respective one of the plurality of third balls is inclined in opposite directions by a predetermined angle with respect to the central axis of the constant velocity joint, and wherein, among the plurality of grooves formed in the inner cage race and the outer cage race, each pair of grooves forming a track for a respective one of the plurality of second balls is formed parallel to each other.

5. The ball-type constant velocity joint as claimed in claim 1 or 2, wherein the plurality of grooves having the arc-shaped bottom surface is arranged such that centers of curvature of the plurality of grooves coincide with each other.

6. The ball-type constant velocity joint as claimed in claim 1 or 2, wherein the plurality of grooves having the arc-shaped bottom surface is arranged such that centers of curvature of the plurality of grooves coincide with a rotational center of the constant velocity joint.

7. The ball-type constant velocity joint as claimed in claim 1 or 2, wherein the plurality of grooves having the arc-shaped bottom surface is arranged such that centers of curvature of the plurality of grooves coincide with a rotational center of the constant velocity joint in a longitudinal direction of the constant velocity joint and are offset from the rotational center of the constant velocity joint in a radial direction of the constant velocity joint.

8. The ball-type constant velocity joint as claimed in claim 7, wherein the centers of curvature of the plurality of grooves having the arc-shaped bottom surface are positioned closer to corresponding ones of the plurality of grooves than the rotational center of the constant velocity joint in the radial direction of the constant velocity joint.

9. The ball-type constant velocity joint as claimed in claim 7, wherein the centers of curvature of the plurality of grooves having the arc-shaped bottom surface are positioned farther from corresponding ones of the plurality of grooves than the rotational center of the constant velocity joint in the radial direction of the constant velocity joint.

10. The ball-type constant velocity joint as claimed in any one of claims 1 to 4, wherein among the plurality of grooves formed in each of the races, each pair of adjacent grooves is inclined in opposite directions by a predetermined angle with respect to a central axis of the constant velocity joint.

11. The ball-type constant velocity joint as claimed in any one of claims 1 to 4, wherein if the inner race is articulated by an angle of N with respect to a central axis of the constant velocity joint, the inner cage race is articulated by an angle of 3N/4, the middle cage race is articulated by an angle of N/2, and the outer cage race is articulated by an angle of N/4.

* * * * *